United States Patent [19]

Freewalt et al.

[11] Patent Number: 4,508,194
[45] Date of Patent: Apr. 2, 1985

[54] SAWHORSE AND BRACKET THEREFOR

[75] Inventors: Wayne L. Freewalt, St. Marys; Joseph L. Ziegler, Wapakoneta, both of Ohio

[73] Assignee: E-Z Buck, Inc., St. Marys, Ohio

[21] Appl. No.: 548,266

[22] Filed: Nov. 3, 1983

[51] Int. Cl.³ ............................................. F16M 11/00
[52] U.S. Cl. ........................................ 182/153; 182/225
[58] Field of Search ............... 182/153, 154, 155, 181, 182/182, 183, 184, 185, 224, 225, 226

[56] References Cited

U.S. PATENT DOCUMENTS

| | | | |
|---|---|---|---|
| 2,197,187 | 4/1940 | Larson | 182/181 |
| 2,330,766 | 9/1943 | Walstrom | 182/224 |
| 2,533,776 | 12/1950 | Dustman | 182/185 |
| 2,981,366 | 4/1961 | Gutting | 182/185 |
| 3,016,586 | 1/1962 | Atkins | 52/DIG. 6 |
| 3,042,144 | 7/1962 | Larson | 182/185 |
| 3,064,756 | 11/1962 | Finizza | 182/181 |
| 3,311,194 | 3/1967 | Kriplen | 182/226 |
| 3,370,675 | 2/1968 | Larson | 182/224 |
| 3,480,111 | 11/1969 | Larson | 182/224 |
| 3,618,704 | 11/1971 | Smith | 182/155 |
| 3,627,075 | 12/1971 | Enders et al. | 182/224 |
| 3,858,682 | 1/1975 | Larson | 182/153 |
| 4,375,245 | 3/1983 | Schill | 182/155 |

Primary Examiner—Reinaldo P. Machado
Attorney, Agent, or Firm—Biebel, French & Nauman

[57] ABSTRACT

An improved sawhorse of the type having a cross beam and at least two pairs of legs extending downwardly therefrom in supporting relation, includes an improved bracket consisting of a bracket body, a plate for clamping a pair sawhorse legs to the body in a splayed configuration, and a bolt extending upwardly through the body and through the cross beam defining a substantially vertical, pivotal axis for the body to rotate relative to the beam. The body includes a substantially horizontal bearing surface at an upper portion thereof which pivots against the beam as the body is rotated. The legs attached to the body can be pivoted from a supporting configuration to a storage configuration in which the legs and beam lie in a common plane. In a preferred embodiment, the bearing surface of the bracket body includes detent recesses and a plate having a detent tab is attached to the cross beam in superposed relation to the bearing surface so that the bracket body can be rotated to a number of predetermined positions relative to the cross beam in which the detent tab engages the detent recesses.

15 Claims, 9 Drawing Figures

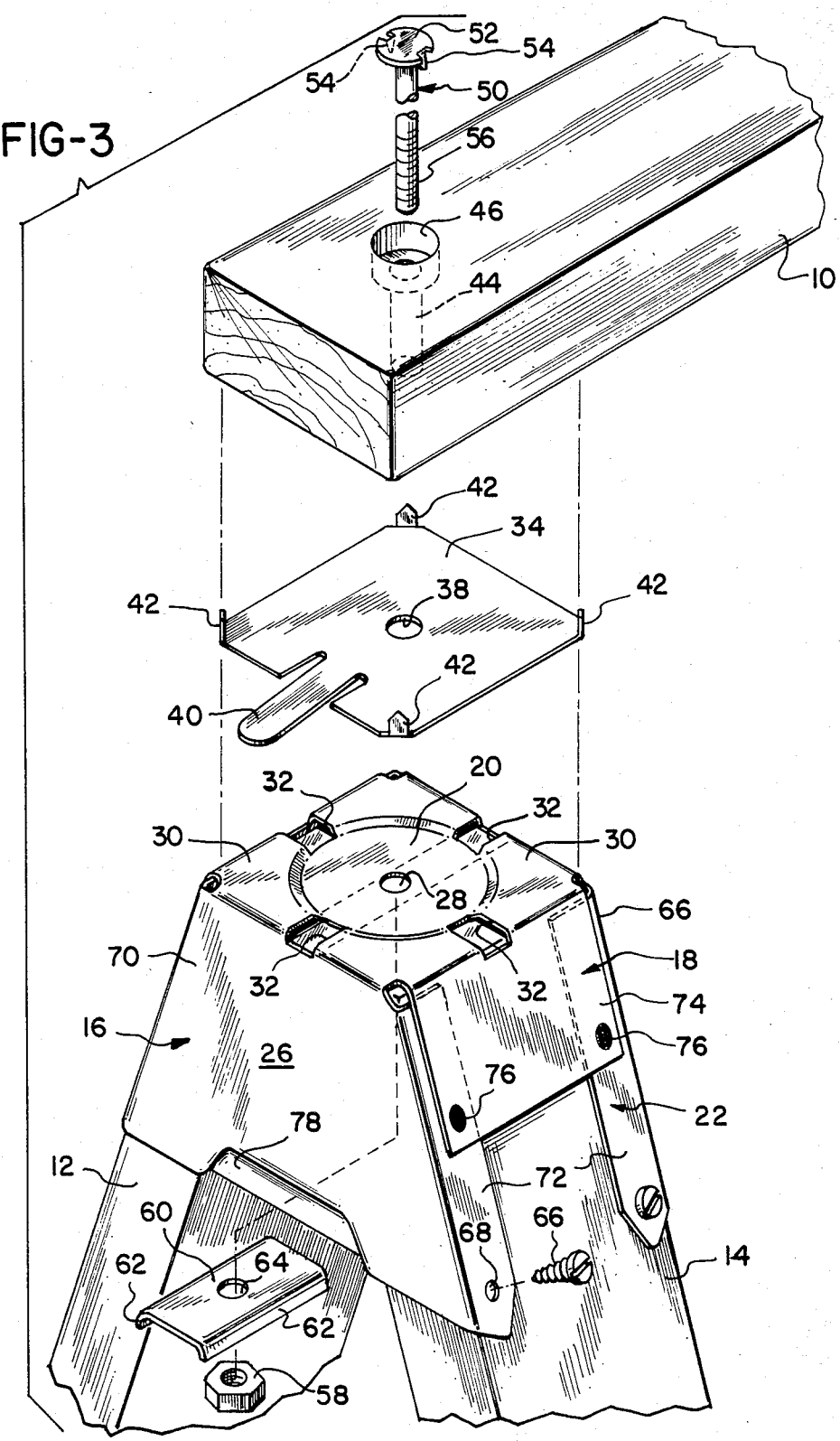

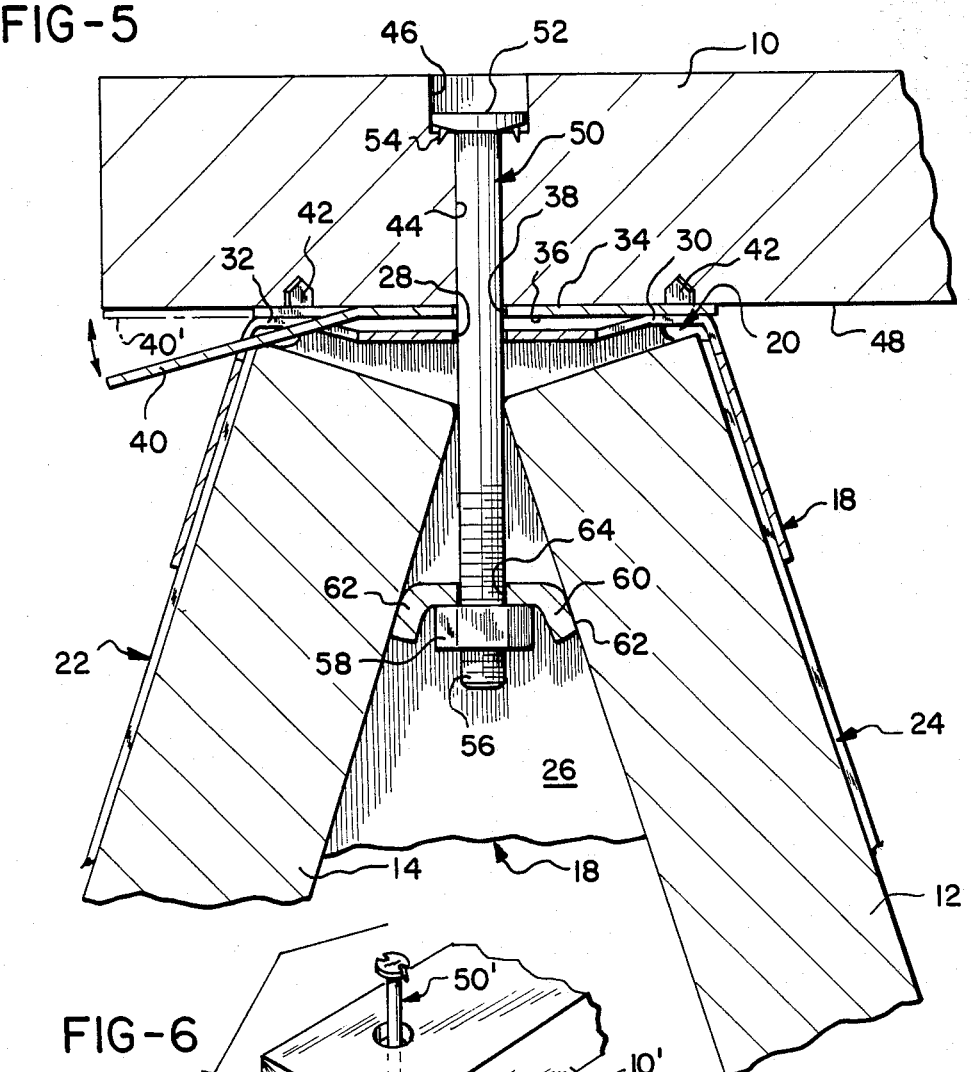
FIG-5
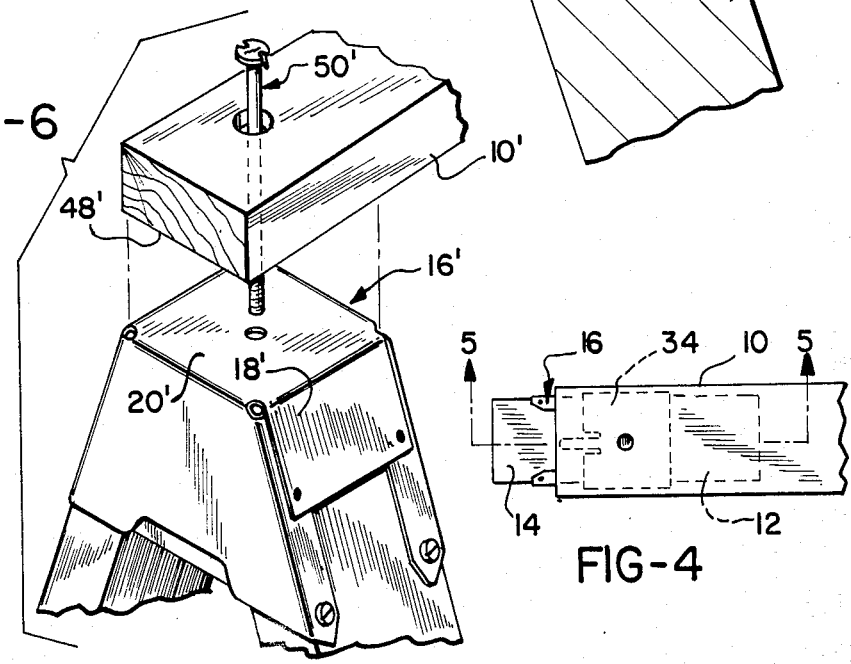
FIG-6
FIG-4

SAWHORSE AND BRACKET THEREFOR

BACKGROUND OF THE INVENTION

The present invention relates sawhorses and sawhorse brackets, and more particularly to sawhorse brackets which facilitate the collapse of a sawhorse from a workpiece supporting configuration to a storage configuration.

The well-known sawhorse comprises a cross beam, oriented substantially horizontally, and supported by two pairs of legs, which extend downwardly and outwardly from the cross beam in a splayed configuration resembling an inverted "V". The time and effort required to fabricate this type of sawhorse can be greatly reduced by utilizing sawhorse brackets to join the pairs of legs to the cross beam of the horse. Typical examples of such brackets are disclosed in Walstrom U.S. Pat. No. 2,330,766; Larson U.S. Pat. No. 3,370,675; Larson U.S. Pat. No. 3,042,144; and Enders U.S. Pat. No. 3,627,075.

In each of these patents, the brackets disclosed each comprise a pair of opposing plates which define channels for receiving the legs of the sawhorse, and a cutout at an upper part thereof for receiving the cross beam. The legs are held in clamped relationship between the plates by nails which are driven into the legs and through holes in the plates, and/or by bolts which extend between the plates at a central location so that they do not interfere with the positioning of the legs. The cross beam is similarly attached to the plates by nails, or is held to the plates by a single bolt which is oriented substantially vertically and passes through a lug which is attached to one of the cross bolts. Movement of the brackets relative to the cross beam is prevented since the cross beam is held within the notches formed in the brackets.

While such sawhorses are relatively easy to fabricate and are relatively rigid, they are not collapsible and must be disassembled for storage, which requires that the nails attaching the brackets be removed and/or the bolts loosened and removed from the plates. The labor required, especially in removing the nails from the legs and cross beam, oftentimes prohibits this disassembly and, as a result, these sawhorses are rarely disassembled for storage.

However, sawhorses have been developed in which the legs fold relative to the cross beam to provide a collapsed configuration so that the sawhorse may be stored more easily. For example, in Schill U.S. Pat. No. 4,375,245, the legs are individually pivotable from a splayed, supporting configuration to a storage configuration in which they are aligned substantially parallel with the cross beam. In Larson U.S. Pat. No. 3,858,682, the legs each pivot about an axis which is substantially parallel to the longitudinal dimension of the cross beam, so that the legs can be pivoted inwardly toward each other to lie in substantially the same plane as the cross beam when in a storage configuration.

A disadvantage with the Schill device is that it appears to be a relatively complicated design and therefore would be relatively expensive to fabricate. Furthermore, the legs must each be pivoted independently to knock down the sawhorse for storage, which requires additional time. A disadvantage with the Larson device is that, while the legs may be pivoted inwardly, the bracket, having a relatively triangular shape, remains fixed so that the overall shape of the collapsed sawhorse is not entirely in one plane.

Accordingly, there is a need for a sawhorse incorporating sawhorse brackets which are relatively inexpensive to manufacture, and provide for a sawhorse which can be oriented in a workpiece supporting configuration, or a storage configuration with a minimum of time and effort. Furthermore, the brackets should be relatively rugged in design and positively hold the legs and cross beam of the sawhorse.

SUMMARY OF THE INVENTION

The present invention is a sawhorse of the type having a cross beam and at least two pairs of legs extending downwardly therefrom in supporting relation, having an improved sawhorse bracket which includes a bracket body, an adjustable plate for attaching a pair of sawhorse legs to the body in a splayed configuration, and a bolt, anchored to the plate and bracket body, which extends upwardly through the body and the cross beam to provide a substantially vertical axis about which the body and attached legs may pivot relative to the cross beam. Thus, a sawhorse incorporating a pair of such brackets can be oriented in a supporting configuration, in which the legs clamped to each bracket extend downwardly and sidewardly from the cross beam, or to a storage configuration in which the splayed legs of each bracket lie in a common plane with the cross beam, thereby forming a substantially flat structure which may be stacked or stored upright in a relatively narrow space.

Each bracket is unitary in structure and includes an upper, substantially horizontal bearing surface, a pair of opposing side walls which extend downwardly and outwardly from the bearing surface, and a pair of opposing end walls which extend between the side walls, thereby forming a rigid structure. The brackets may be easily fabricated from a single piece of sheet metal, or can be of cast, molded or drawn construction.

The bolt extends upwardly through the bearing surface and is anchored to the plate by a self-locking nut. Threading the nut relative to the bolt causes the plate to clamp the legs of the sawhorse against the inclined side walls, thereby forcing the legs to assume a proper, splayed relation. The bolt extends upwardly through the bearing surface and is preferably headed so that it can clamp the cross beam to the bearing surface. Thus, the bracket can be pivoted about the bolt so that the bearing surface of the body rotates against the underside of the cross beam.

An advantage of the invention over prior art devices is that the legs of the sawhorse can be attached to the bracket simply by threading a single nut onto the bolt, which acts to clamp the legs between the plate and side walls of the bracket at well as clamp the cross beam to the bearing surface. However, it is preferable to increase the rigidity of the overall structure even further by driving screws through the sidewalls of the brackets into the legs. The screws can be removed relatively easily should the sawhorse be dismantled. An additional advantage of the invention is that the legs can be pivoted to the storage configuration without having to loosen them from the brackets. Thus, the legs can be attached securely to the brackets, then repeatedly changed from the storage to the supporting configuration. An additional advantage is that the sawhorse brackets can be used in combination with lengths of common timber, and do not require specially cut lumber or legs which are specially fabricated from materials other than wood.

In a preferred embodiment, the bearing surface includes a plurality of detent recesses, and a detent plate, having a mating bearing surface, is fixed to the underside of the cross beam directly above the body bearing surface. The detent plate includes a detent finger which is positioned to engage a selected one of the detent recesses as the bracket body is pivoted relative to the cross beam. An advantage of the detent structure is that the sawhorse bracket can be maintained in the supporting configuration or storage configuration without inadvertent pivoting.

Accordingly, it is an object of the present invention to provide a sawhorse having brackets which facilitate the setting up of the sawhorse from a storage configuration to a supporting configuration; a sawhorse having brackets which are relatively inexpensive to fabricate and which provide a rigid connection between the legs and cross beam of a sawhorse; and a sawhorse having a bracket which facilitates the assembly of the sawhorse and does not require a large number of tools.

Other objects and advantages of the invention will become apparent from the following description, the accompanying drawings and appended claims.

BRIEF DESCRIPTION OF THE DRAWINGS

FIG. 3 is a exploded detail view in perspective of one of the brackets shown in FIGS. 1 and 2;

FIG. 4 is a detail plan view of the sawhorse of FIG. 2;

FIG. 5 is a side elevation in section of the bracket taken at line 5—5 of FIG. 4;

FIG. 6 is a detail, exploded view in perspective of a sawhorse having a bracket representing an alternate embodiment of the invention;

DETAILED DESCRIPTION OF THE PREFERRED EMBODIMENTS

Figure 1:
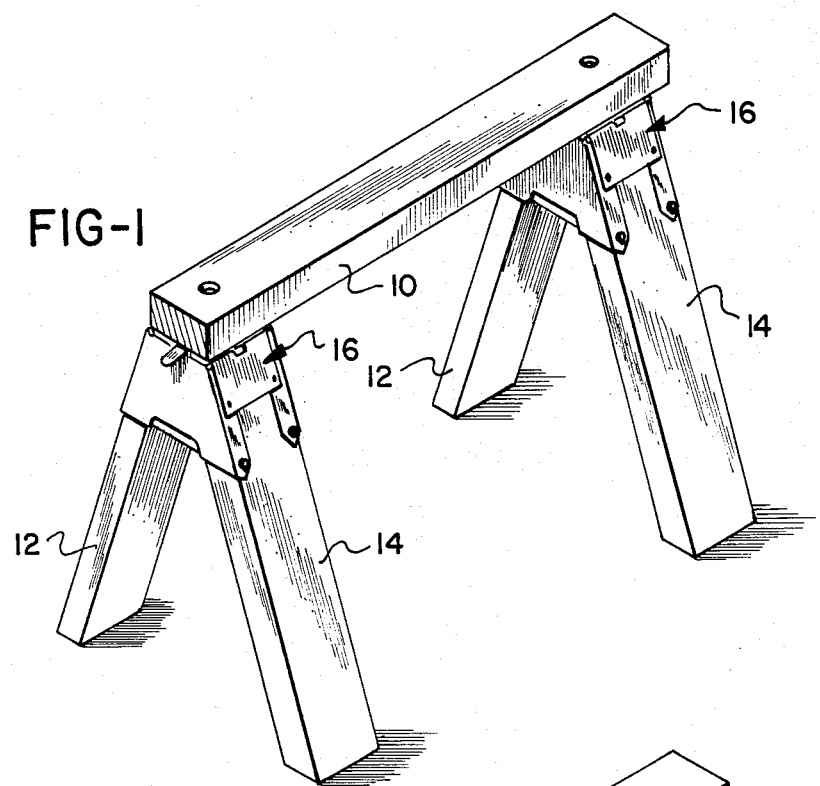
FIG. 1 is a perspective view of a sawhorse of the present invention in which the brackets have been pivoted relative to the cross beam to position the legs in a supporting configuration.
Figure 2:
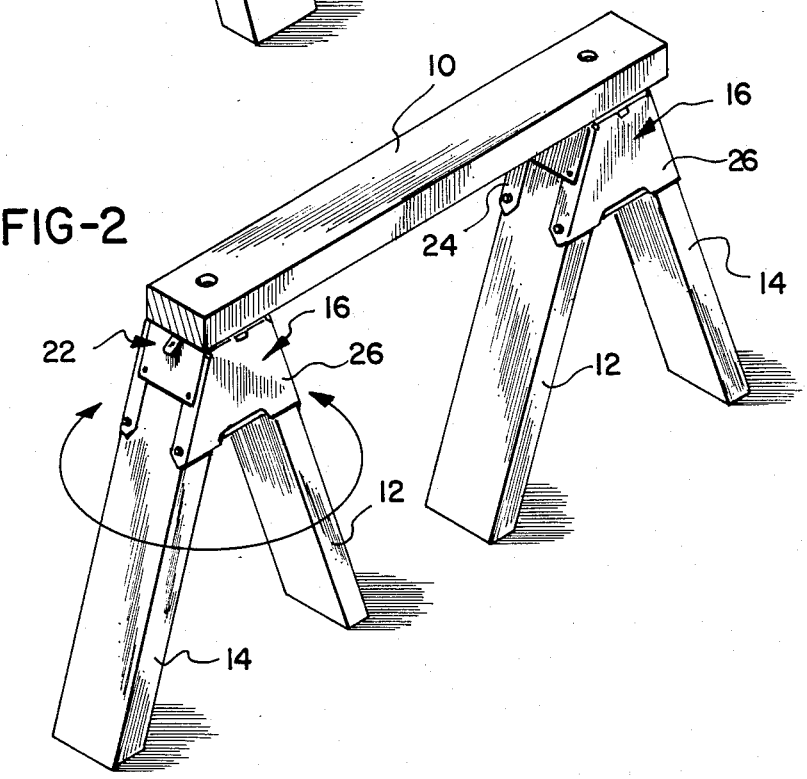
FIG. 2 is a perspective view of the sawhorse of FIG. 1 in which the brackets have been pivoted to orient the legs in a storage configuration.

A sawhorse of the present invention is shown in FIGS. 1 and 2 and includes a cross beam 10, two pairs of legs 12, 14 and brackets 16. The sawhorse shown in FIG. 1 is in a supporting configuration in which the pairs of legs 12, 14 extend downwardly and sidewardly from the cross beam 10. The sawhorse shown in FIG. 2 is in a storage configuration and differs from that shown in FIG. 1 in that the brackets 16 have been pivoted relative to the cross beam 10 such that the pairs of legs 12, 14 are positioned in a common plane with the cross beam.

A typical bracket 16 is shown in FIGS. 3, 4 and 5. It is understood that the brackets 16 as shown in FIGS. 1 and 2 are of identical construction and that the details shown in FIGS. 3, 4 and 5 apply to both.

Each bracket 16 includes a body 18 having a substantially horizontal bearing surface 20 at an upper end thereof, a pair of opposing side walls 22, 24 extending downwardly and outwardly from the bearing surface, and a pair of opposing end walls 26 extending between the side walls (also shown in FIG. 2). The bearing surface includes a central opening 28 which is surrounded by a raised portion 30 having a plurality detent openings or stops 32 formed therethrough. A detent plate 34 having a mating bearing surface 36 is superposed to the bearing surface 20 and includes an opening 38 which is positioned in registry with the opening 28. The detent plate 34 includes a detent tab 40 extending outwardly from an edge thereof, and a plurality of upwardly pointed prongs 42 at the corners thereof.

The cross beam 10 includes a bore 44 having a countersink 46 which is oriented in registry with the openings 38, 28 of the detent plate 34 and bearing surface 20, respectively. As best shown in FIGS. 4 and 5, the detent plate 34 is fixed to the underside 48 of the cross beam 10 by the prongs 42 so that the mating bearing surface 36 engages the raised portion 30 of the bearing surface 20. A bolt 50 extends through the bore 44 and openings 38, 28 and includes a head 52 which fits within the countersink 46. The head 50 is punched to form downwardly depending prongs 54 which engage the floor of the bore 44 to prevent relative rotation between the bolt 50 and cross beam 10.

The bolt 50 includes a threaded shank 56 which is threadedly engaged by a prevailing torgue or lock nut 58. A plate 60 is of a generally rectangular shape and includes a pair of opposing beveled edges 62 and a central hole 64. The shank 56 of the bolt 50 passes through the hole 64, and the plate 60 and is retained on the shank by the nut 58.

As shown in FIGS. 3, 4 and 5, the legs 12, 14 are positioned such that their upper ends lie against the inner surfaces of the side walls 22, 24 and are clamped thereagainst by the beveled edges 62 of the plate 60. Thus, by tightening the nut 58 down on the threaded shank 56 of the bolt 50, the cross beam 10 is drawn toward the bearing surface 20, thereby clamping the detent plate 34 against the raised portion 30, and the legs 12, 14 are held against the inside surfaces of the side walls 22, 24 so that they assume the splayed configuration shown in FIGS. 1 and 2.

As shown in FIG. 3, the legs 12, 14 preferably are further secured to the side walls 22, 24 by screws 66 which are driven through holes 68 in the lower portions of the side walls, (shown only for side wall 22 and leg 14).

As best shown in FIG. 5, the detent tab 40 is bent downwardly from the plane of the detent plate 34 so that it can engage a selected one of the detent stops 32. To rotate a bracket 16 and associated legs 12, 14 relative to the cross member 10, the detent tab 40 of the associated plate 34 is first urged upwardly to a position 40', thereby removing it from engagement with the detent stop 32. The bracket 16 is then pivoted about a substantially vertical axis defined by the shank 56 of the bolt 50 relative to the cross beam 10. Rotation continues until the detent tab 40 engages a next adjacent one of the detent stops 32.

Preferably, as shown in FIG. 3, four detent stops 32 are formed in the raised surface 30, each positioned at an angular displacement of approximately 90° from the two stops on either side. Thus, the bracket 16 and legs 12, 14 can be rotated in 90° increments relative to the cross beam 10 so that a single pivotal movement of the bracket 16 from one detent stop 32 to the next will cause the legs 12, 14 to pivot 90 degrees, thereby positioning the sawhorse in either a storage configuration or a supporting configuration, as shown in FIGS. 1 and 2.

An alternate embodiment of the invention is shown in FIG. 6 in which the bracket 16' comprises a body 18' including a bearing surface 20' which is substantially flat and does not include the raised portion 30 or detent stops 32 shown in FIG. 3. In this embodiment, the bearing surface 20' directly contacts the underside 48' of the cross beam 10' so that pivotal movement of the bracket 16' about the axis defined by the bolt 50' causes the bearing surface 20 to slide against the underside 48'.

It is preferable with any of the embodiments of the invention to fabricate the bracket 16, 16A from a single piece of sheet metal. As shown best in FIG. 3, this single piece of sheet metal is stamped to provide wings 70 forming the end walls 26 and include shoulders 72 which are folded at right angles to the end walls to form a portion of the side walls 24. Flaps 74 are formed to fold down over the shoulders 72 and are connected thereto by tack welds 76. The bearing surface 20 would be positioned at the center of the stamping such that the wings 70 and flaps 74 extend radially outwardly from it. The raised portion 30, hole 28, and detent stops 32 all could be part of this single stamping. Furthermore, the wings 70 are stamped to provide a recess 78 which is shaped to cooperate with the shoulders 72 to form guides to receive the ends of the legs 12, 14 of the sawhorse.

Figure 7:
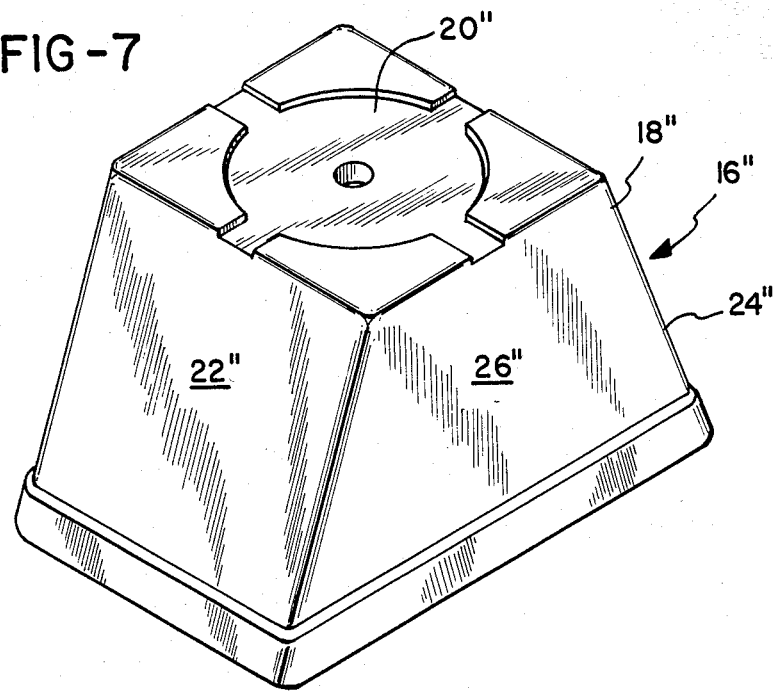
FIG. 7 is a perspective view of a bracket of a third embodiment of the invention.

It should be noted that other methods of fabricating the bracket body can be employed without departing from the scope of the invention. For example, as shown in FIG. 7, a bracket 18B includes a body 18' formed from a single piece of sintered metal. End walls 26" and side walls 22", 24" are rectangular in shape and are integral with bearing surface 20" and each other. Alternately, the bracket could be formed by cast molding or drawing, and have the same shape as the bracket 16" of FIG. 7.

Figure 8:
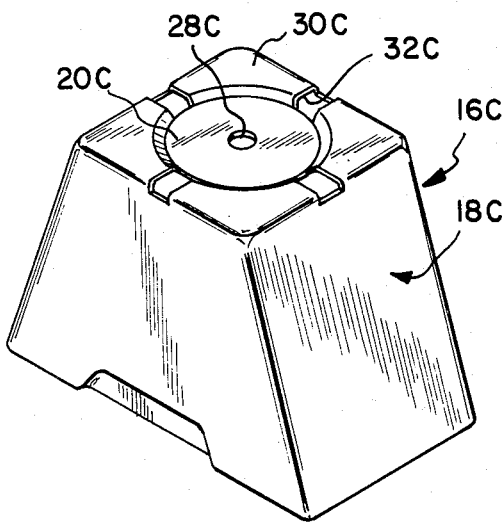
FIG. 8 is a perspective view of a bracket of a fourth embodiment of the invention.

Another example of a construction for a bracket is shown in FIG. 8. The bracket body 16C is made by deep drawing a steel cup. This method would require no welding, tabs or the like. It would include a raised portion 30C having detent openings 32C formed in it, and a bearing surface 20C having a central opening 28C formed therein.

Figure 9:
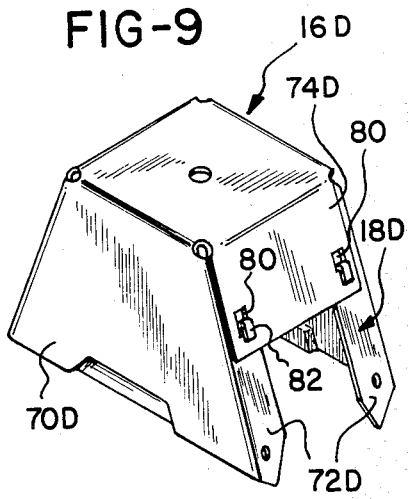
FIG. 9 is a perspective view of a fifth embodiment of the invention.

Another embodiment of a bracket 16D is shown in FIG. 9. This bracket 16D includes a body 18D which is similar in construction to the body 18 shown in FIG. 3, in that it includes wings 70D, shoulders 72D, and flaps 74D. The flaps 74D include openings 80 through which tabs 82 extend. Tabs 82 are punched from shoulders 72D. Thus, the body 18D shown in FIG. 9 can be fabricated without the necessity of tack welding.

While the forms of apparatus herein described constitute preferred embodiments of the invention, it is to be understood that the invention is not limited to these precise forms of apparatus, and that changes may be made therein without departing from the scope of the invention.

What is claimed is:

1. For use with a sawhorse of the type having a cross beam and at least two pairs of legs extending downwardly therefrom in supporting relation, an improved sawhorse bracket comprising:
 a bracket body;
 means for attaching a pair of sawhorse legs to said body in a splayed configuration; and
 means for pivotally attaching said body to a cross beam such that said body may be pivoted about a substantially vertical axis relative to an attached cross beam whereby splayed legs attached to said body may be rotated to a storage configuration or to a supporting configuration.

2. The sawhorse bracket of claim 1 wherein said body includes a first substantially flat bearing surface oriented normal to said vertical axis and positioned to abut an attached cross beam.

3. The sawhorse bracket of claim 2 wherein said pivotal attaching means includes a bolt attached to said body, said bolt defining said vertical axis and protruding through said bearing surface.

4. The sawhorse bracket of claim 3 wherein said attaching means includes a plate adjustably attached to said bolt and positioned below said first bearing surface such that said plate may be displaced toward said bearing surface to clamp a pair of legs against said body.

5. The sawhorse bracket of claim 4 wherein said body includes a pair of opposing side walls extending downwardly and diverging outwardly from said first bearing surface; and said plate is positioned to clamp a pair of legs thereagainst in a splayed configuration.

6. The sawhorse bracket of claim 5 wherein said body includes a pair of opposing end walls joined to said side walls such that said plate is enclosed by said side walls and end walls.

7. The sawhorse bracket of claim 2 wherein said first bearing surface includes a plurality of detent stops positioned about said axis; and said bracket further comprises detent means for selectively engaging said detent stops and having means for fixedly attaching to an associated cross beam such that said body may be pivoted to a selected orientation relative to said detent means and retained in said orientation by interengagement of said detent means with a selected one of said detent stops.

8. The sawhorse bracket of claim 7 wherein said detent means includes a second bearing surface superposed to said first bearing surface such that pivotal movement of said body relative to said detent means effects relative movement between said first and second bearing surfaces.

9. The sawhorse bracket of claim 8 wherein said fixedly attaching means includes prongs extending upwardly from said detent means.

10. For use with a sawhorse of the type having a cross beam and at least two pairs of legs extending downwardly therefrom in supporting relation, an improved sawhorse bracket comprising:
 a bracket body having a first substantially horizontal bearing surface and positioned to abut an attached cross beam, a pair of opposing side walls extending downwardly and diverging outwardly from said first bearing surface and a pair of opposing end walls extending between and joining said side walls;
 a bolt extending through said bearing surface for pivotally attaching said body to a cross beam and defining a substantially vertical axis normal to said first bearing surface about which said body pivots relative to said cross beam; and
 a plate adjustably attached to said bolt below said first bearing surface and between said side walls such that said plate may clamp legs against said side walls in a splayed configuration whereby said body may be pivoted relative to an attached cross beam to position clamped legs in a supporting configuration or a storage configuration.

11. In a sawhorse of the type having a cross beam and at a pair of legs extending downwardly therefrom in supporting relation, an improved sawhorse bracket comprising:
a bracket body;
means for attaching said pair of legs to said body in a splayed configuration; and
means for pivotally attaching said body to said cross beam such that said body may be pivoted about a substantially vertical axis relative to said cross beam whereby said legs may be rotated to a storage configuration or to a supporting configuration.

12. The sawhorse of claim 11 wherein said body includes a substantially flat first bearing surface, a pair of opposing side walls extending downwardly and diverging outwardly therefrom, and a pair of opposing end walls extending between said side walls.

13. The sawhorse of claim 12 wherein said pivotal attaching means includes a bolt extending through said cross beam and said first bearing surface, thereby clamping said cross beam to said first bearing surface, said bolt being coaxial with said vertical axis.

14. The sawhorse of claim 13 wherein said leg attaching means includes a plate displaceably attached to said bolt below said first bearing surface and abutting said legs to clamp said legs against said side walls, said plate anchoring said bolt to said body, thereby holding said cross beam against said first bearing surface.

15. The sawhorse of claim 14 wherein said first bearing surface includes detent stops spaced about said vertical axis; and said sawhorse further comprises a detent plate having a second bearing surface contacting said first bearing surface, a detent tab for engaging a selected one of said stops, and means fixedly attaching said plate to said cross beam such that said plate is superposed to said first bearing surface.

* * * * *